Patented Feb. 12, 1952

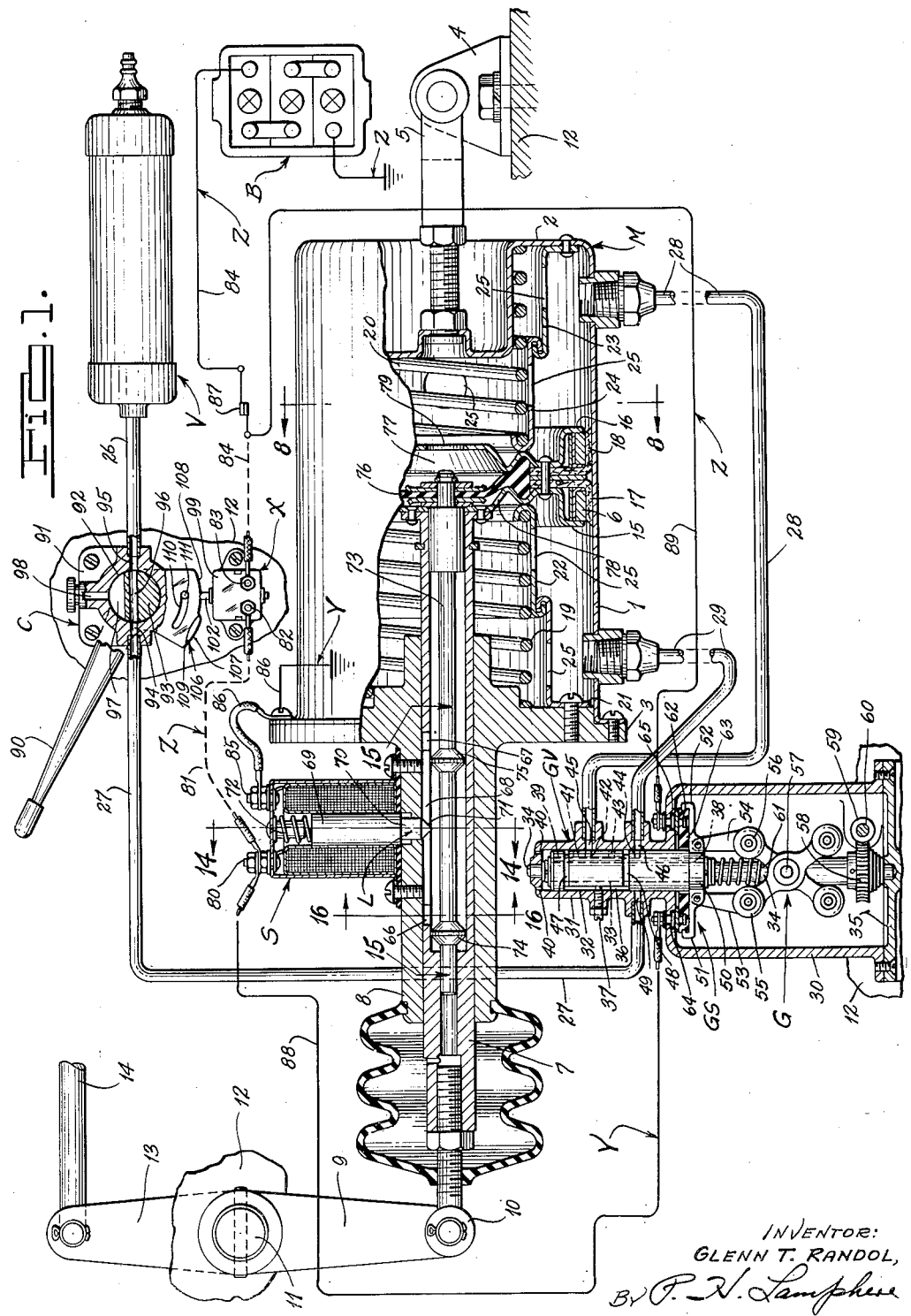

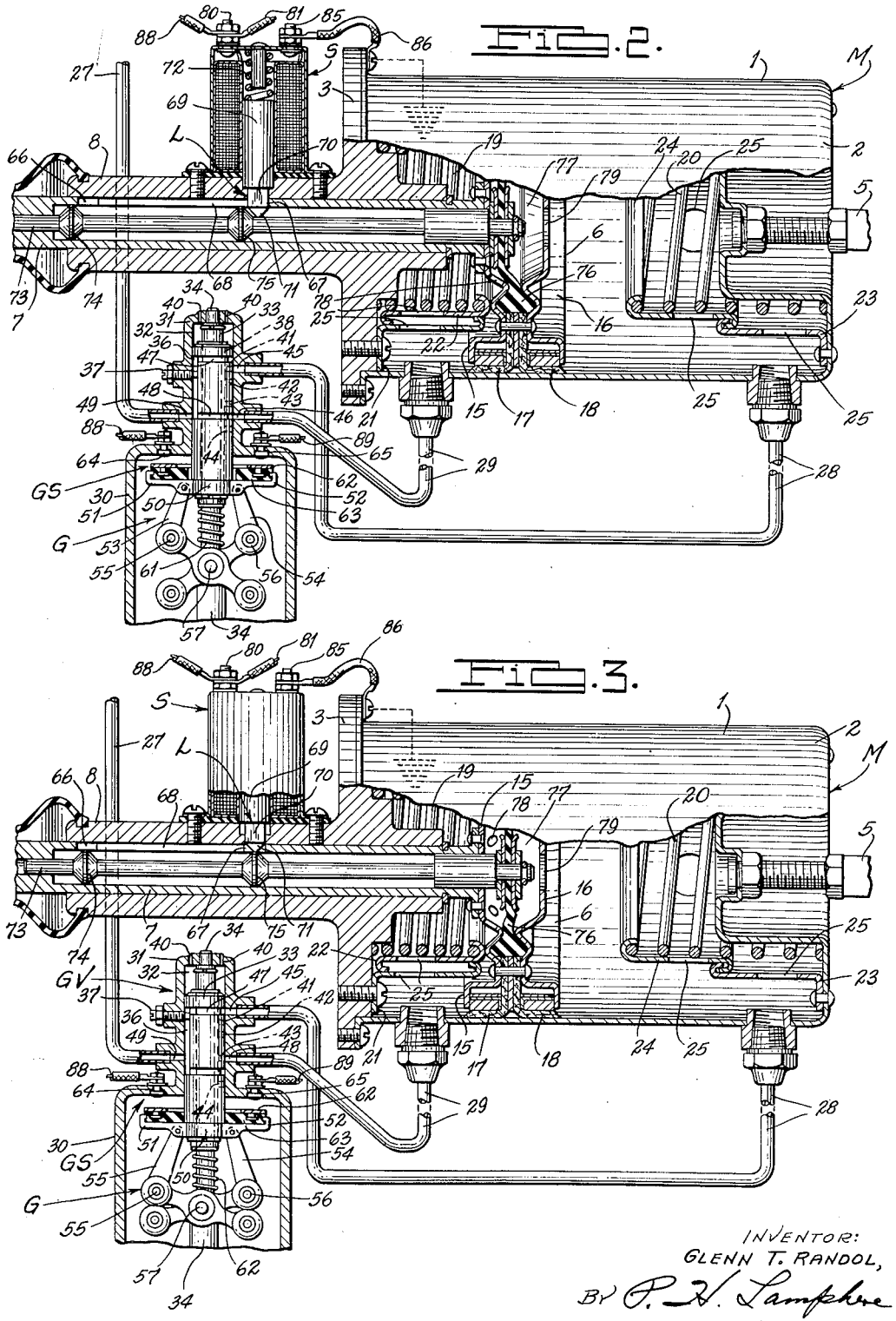

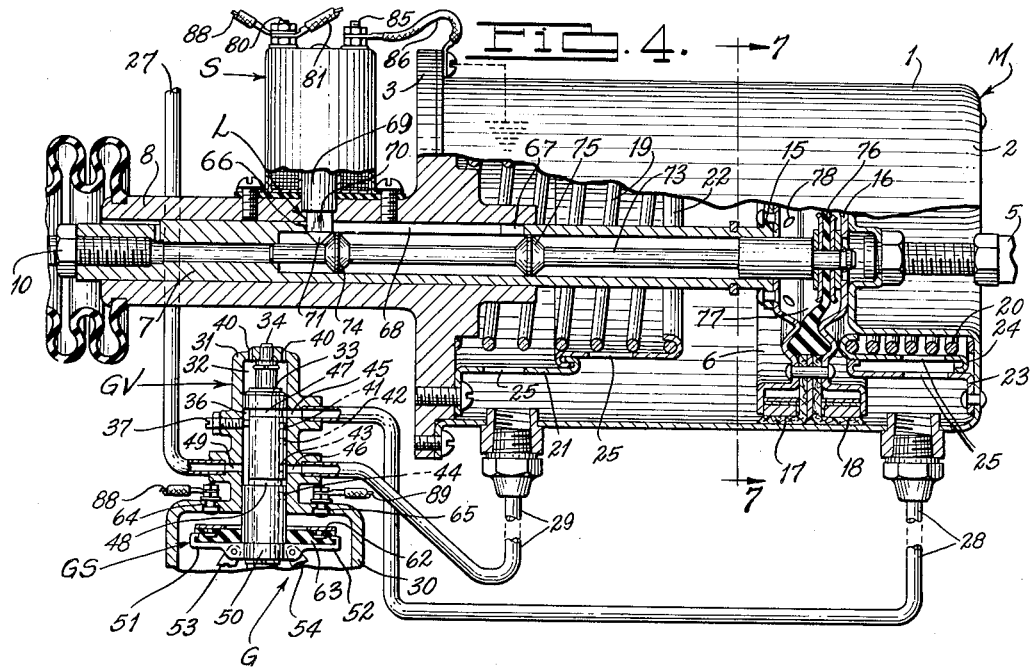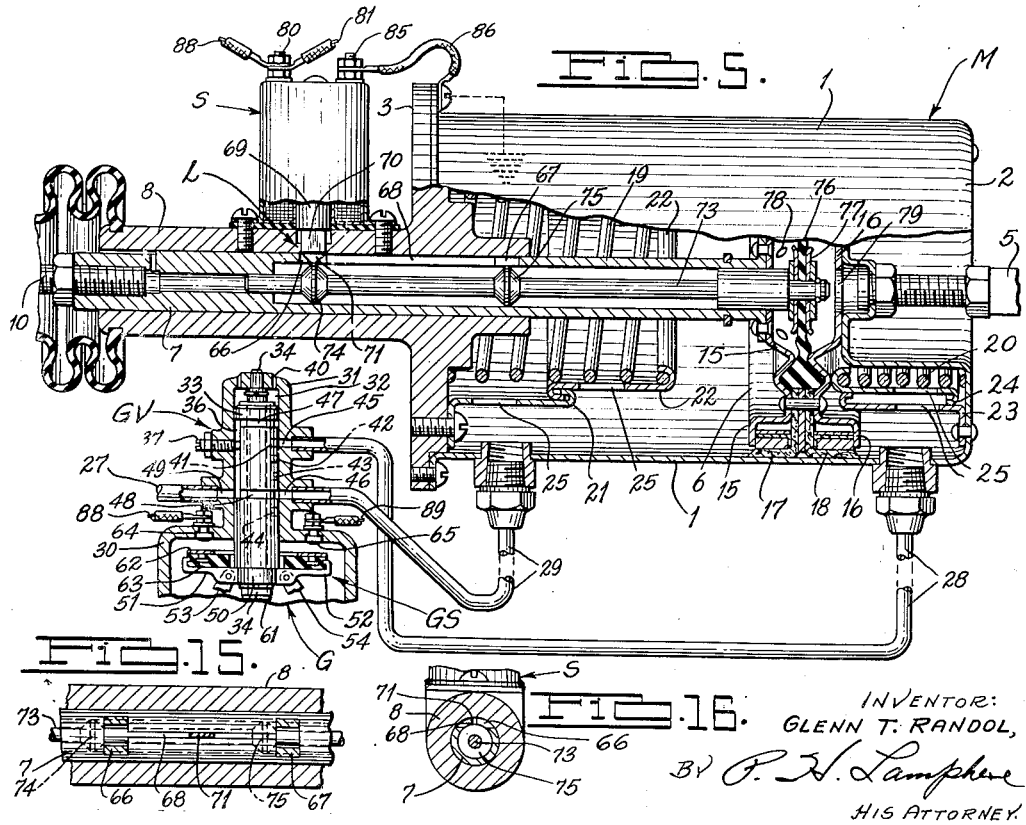

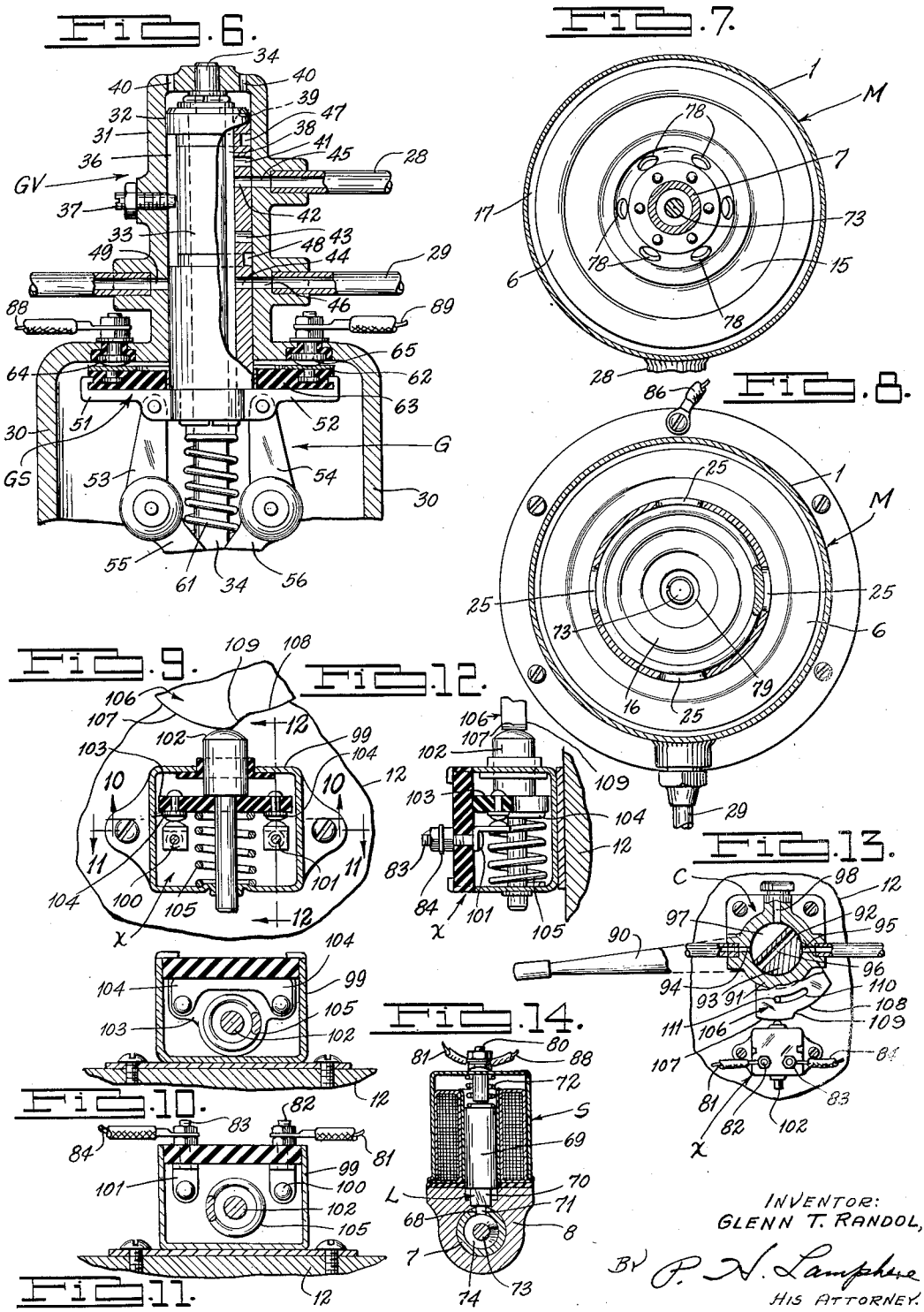

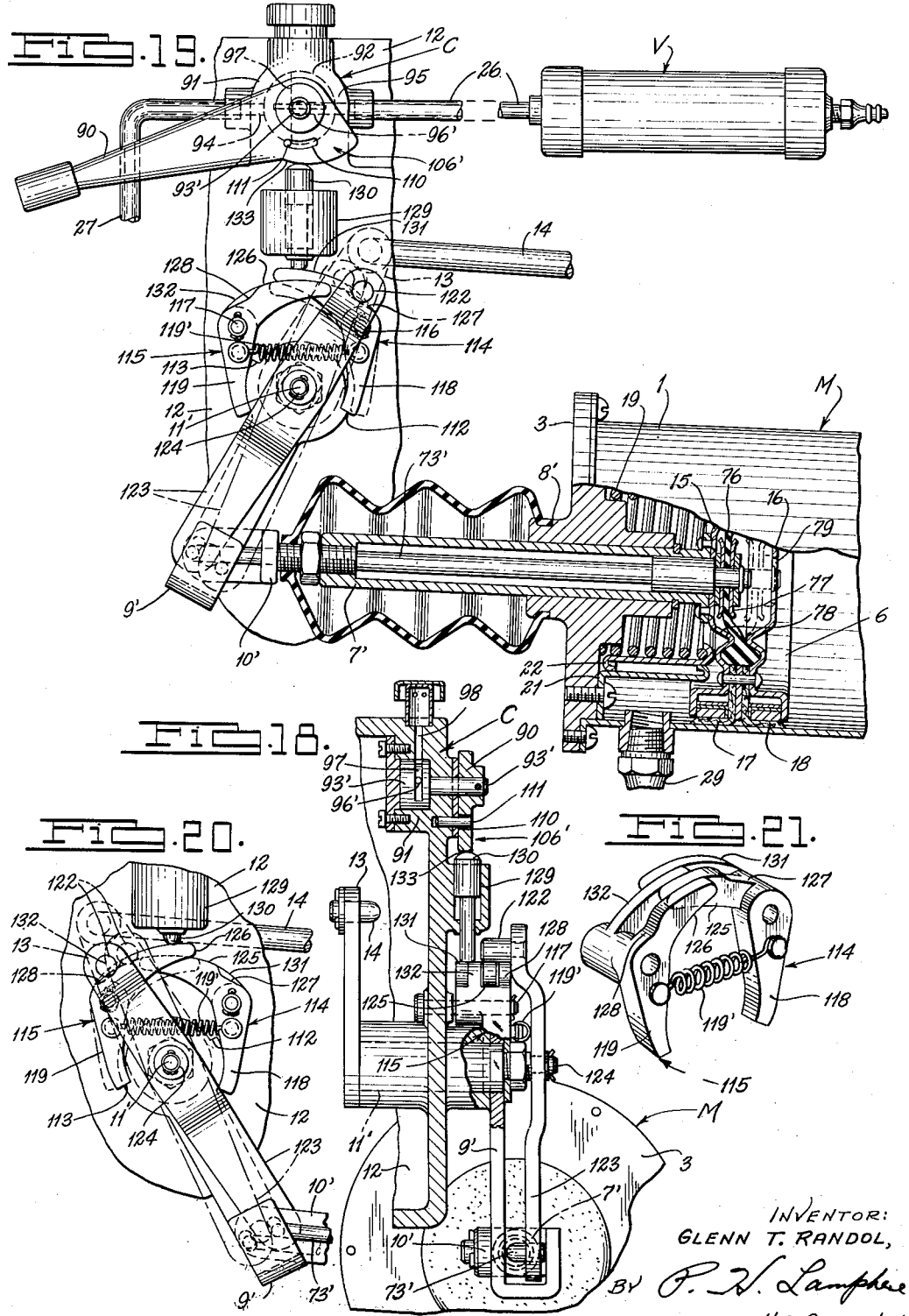

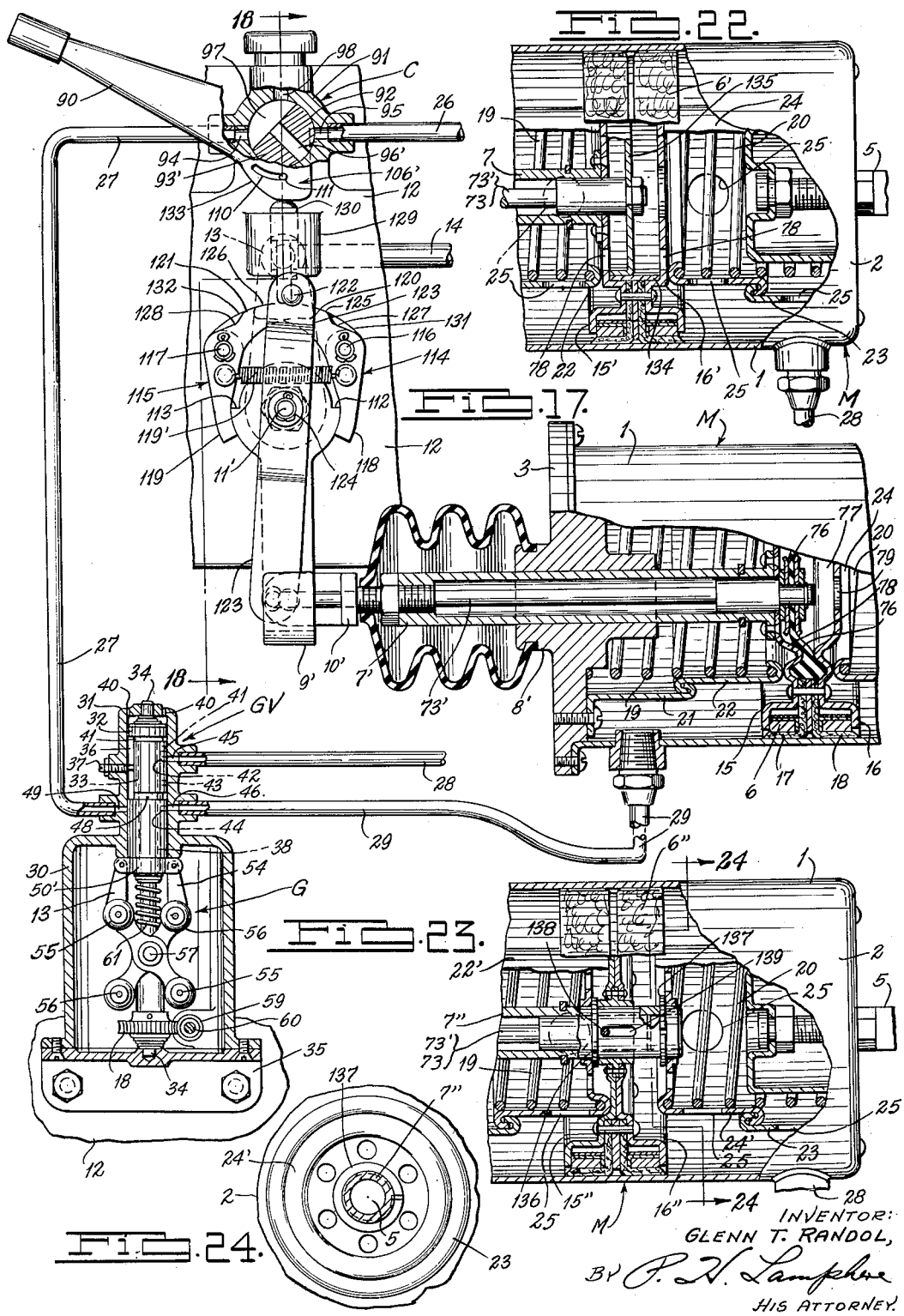

2,585,837

UNITED STATES PATENT OFFICE 2,585,837

FLUID PRESSURE ACTUATED MOTOR AND CONTROL SYSTEM THEREFOR

Glenn T. Randol, St. Louis, Mo.

Application June 1, 1946, Serial No. 673,871

23 Claims. (Cl. 121—38)

This invention relates to fluid actuated motors and more particularly to an improved and novel reciprocatory piston-type of fluid pressure operated motor and control system therefor.

A primary object of the present inveniton is to produce novel and improved means for controlling the movable element of a fluid actuated motor whereby said element may be selectively actuated by fluid pressure to a predetermined position and automatically locked mechanically in the said position.

An object related to that last stated is to selectively lock said element against a biasing force continuously tending to restore said element to a different predetermined position.

A further object related to the two objects next above stated is to provide improved fluid pressure operated means for selectively releasing said locking means to free said movable element for movement, and wherein said fluid operated releasing means is incorporated as a component of the aforesaid movable element.

A more specific object is to produce an improved fluid pressure motor control valve system which will cause the movable element thereof to be alternately moved from one end of its full stroke to the other end against spring centering means in accordance with the condition of a speed responsive control means; and to further associate with the element of the fluid motor, locking means for holding the element at either end of its stroke which will unlock automatically to release said element when conditioned for movement to the other end or vice versa.

A further specific object related to that last stated is to provide novel control valve means operable at will to unlock the locking means and release the motor movable element to return to the central position of its stroke under the action of the spring centering means, notwithstanding the condition of the speed responsive control means.

A further object is to produce a locking means for holding the movable element of a fluid pressure activated motor at either end of its stroke against spring centering means, continuously acting thereon and to associate with the movable element and the locking means a means for automatically unlocking said locking means whenever differential fluid pressure is effective on the movable element to move it from either end of its full stroke.

A still further object is to associate with a movable element of a fluid pressure actuated motor means operable by the differential fluid pressure employed to move said element for causing locking means for the element to become inoperative prior to said element being moved.

Yet another object is to provide in a control system for a fluid actuated motor movable element having associated therewith spring centering means and locking means for holding the element at the extremities of its stroke, a personally-operable means for freeing the element of differential fluid pressures and releasing the locking means at will.

An object related to that last stated is to embody in such a control system either personally-controlled electrically or mechanically actuated means for releasing the locking means.

A further object is to produce an improved fluid pressure operated motor and control means for its movable element which will cause the element to be moved from either of its extremities of movement to a point intermediate its extremities by combined spring and differential fluid pressure forces and from said intermediate point back to either of its extremities solely by differential fluid pressure.

Other objects of the invention will become apparent from the following description taken in connection with the accompanying drawings showing several embodiments thereof.

In the drawings:

Figure 1 is a schematic view of a fluid actuated motor and control system therefor embodying my invention with parts being shown in section and the piston of the fluid motor being shown in the central position of its full stroke, the hand controlled conditioning valve in its open position and the speed-responsively controlled valve substantially in its "at rest" position, and wherein the electrical control circuits are depicted energized by solid lines and non-energized by dashed lines;

Figure 2 is a view partly in section of the fluid motor and the speed-responsive controlled valve showing the piston of the fluid motor after it has moved to the extreme left end of its cylinder and become locked in said position, and wherein the electrical control circuits are depicted non-energized by dashed lines;

Figure 3 is a view of the same structure of Figure 2, but showing the piston ready to be moved to the right end of the cylinder the instant unlocking thereof has been effected, and wherein the electrical control circuits are depicted non-energized by dashed lines;

Figure 4 is a view similar to Figure 2, but showing the piston after it has been moved to the extreme right end of the cylinder and become locked in said position, and wherein the electrical control circuits are depicted non-energized by dashed lines;

Figure 5 is a view similar to Figure 3 showing the piston ready to be moved from the right end of the cylinder the instant unlocking thereof has been effected, and wherein the electrical control circuits are depicted non-energized by dashed lines;

Figure 6 is an enlarged sectional view of the speed responsively controlled switch and valve;

Figure 7 is a cross sectional view of the fluid pressure motor, said view being taken on the line 7—7 of Figure 4;

Figure 8 is another cross sectional view of the fluid pressure motor with said view being taken on the line 8—8 of Figure 1;

Figure 9 is a sectional view of the manually controlled switch associated with the manually-controlled conditioning valve;

Figures 10, 11 and 12 are sectional views taken on the lines 10—10, 11—11 and 12—12 of Figure 9 and showing additional details of the manually-controlled switch associated with the conditioning valve;

Figure 13 is a view partly in section of the manually-controlled conditioning valve and switch with the control lever in a position closing both the valve and the switch, which positions will be assumed when it is desired to unlock and free the piston of the fluid motor and allow it to assume a central position with respect to its full stroke under the action of the centering springs;

Figure 14 is a longitudinal cross sectional view of the solenoid actuated locking plunger, said view being taken on the line 14—14 of Figure 1;

Figure 15 is a sectional view taken on the line 15—15 of Figure 1 and showing details of the locking mechanism and the cams for unlocking said mechanism;

Figure 16 is a sectional view taken on the line 16—16 of Figure 1 and showing further details of the locking and unlocking mechanism for the piston of the fluid motor;

Figure 17 is a view of a modified control mechanism for the fluid actuated motor with parts being shown in section and the locking structure for holding the piston at the extreme ends of its stroke being of the mechanical type and capable of mechanical release at will by the lever which controls the conditioning valve, said piston being in its central position with the locking mechanism inoperative;

Figure 18 is a sectional view taken on the line 18—18 of Figure 17 and showing additional detailed structure of the locking mechanism;

Figure 19 is a view similar to Figure 17, but showing the piston at the extreme left end of its cylinder and locked in this position;

Figure 20 is a view of the locking mechanism showing the position of the parts assumed when the piston of the fluid motor is locked at the extreme right hand end of its cylinder;

Figure 21 is a perspective view of the locking pawls used in the locking mechanism shown in the modified structure;

Figure 22 is a view of a modified fluid actuated motor and piston showing a piston type of structure for unlocking the locking mechanism of either Figure 1 or the modified locking mechanism of Figure 17;

Figure 23 is a view of another modified fluid motor structure wherein the main piston is adapted to have lost-motion movement relative to its piston rod to accomplish the unlocking of the piston, said structure being capable of use either with the locking mechanism of Figure 1 or the modified locking mechanism of Figure 17; and Figure 24 is a sectional view taken on the line 24—24 of Figure 23 and showing further details of the Figure 23 structure.

Referring first to Figures 1 to 16, inclusive, the fluid actuated motor disclosed is generally indicated by the letter M and is of the double reciprocally acting type. This motor has a cylindrical casing 1 provided with end walls 2 and 3. The rear end wall 2 is pivoted to a suitable support 4 by an adjustable connecting rod 5. Within the cylindrical casing 1 is a piston 6 having a hollow piston rod 7 extending through the forward end wall 3 of the fluid motor, which end wall is provided with an axial extension 8 for guiding support of the piston rod. The forward end of the piston rod is connected to an arm 9 by an adjustable connection 10. This arm 9 is shown secured to the outer end of a shaft 11 mounted in a suitable support 12. On the inner end of this shaft is secured an arm 13, the free end of which can be connected by a rod 14 to any member to be actuated as, for example, the shiftable element of an automotive vehicle change-speed gearing, preferably one controlling two forward speeds. It is to be noted that by the pivotal connection of the piston rod with the arm 9 and the pivotal connection of the right end of the fluid motor casing with the support 4, the motor is free to have swinging movement as the arm is actuated, thus eliminating any binding action.

The piston 6 of the fluid motor M is built up from two plate like members 15 and 16 between which are clamped the two opposed packing cups 17 and 18. The piston rod is directly secured to the forward member 15 of the piston. The piston is arranged to be biased to an intermediate position of its full stroke (central position in the particular motor shown) and to accomplish this there are provided two springs 19 and 20 acting on opposite sides of the piston and being interposed between the piston and the end walls. To insure that each spring will be effective in moving the piston only to its central position, the spring 19 at the forward side of the piston has associated therewith two telescoping sleeves 21 and 22. The outer end of the sleeve 21 is secured to the forward end wall 3 and the outer end of the sleeve 22 is arranged to be engaged by the piston end of the spring 19. The inner ends of the sleeves are provided with cooperating flanges in order to limit their axial separation under the action of the spring. In a similar manner the spring 20 has associated therewith two telescopic sleeves 23 and 24, the outer end of the sleeve 23 being connected to the rear wall 2 of the motor casing and the outer end of the sleeve 24 being engaged by the piston end of the spring 20. Cooperating flanges on the inner end of the sleeves limit the extent of expansion of the spring. With this arrangement for limiting the expansion of both springs, it is seen that both springs are effective to insure the centering of the piston whenever the piston is free to move. If the piston is caused to be moved to the left end of the cylinder of the motor, the spring 19 will be compressed and the sleeve 22 will telescope within sleeve 21. The spring 20 will not be effective on the piston as it moves towards the left end from the central position due to the fact that the sleeves 23 and 24, associated with said spring, prevent it from expanding. When the piston is moved from the central position to the right end of the cylinder of the motor, the spring 20 will be compressed and the spring 19 will be prevented from acting on the piston as it moves to the rear end. During movement of the piston toward the right end, the sleeve 24 will telescope within the sleeve 23. All the sleeves are provided with holes 25 so that there can be free interchange of air from the interior to the exterior of the sleeves.

The piston 6 of the fluid motor M is arranged to be moved by the force of differential fluid pressure acting on the faces thereof. The differential fluid pressure may result from having either a super-atmospheric source of pressure or a sub-atmospheric source of pressure; such as, vacuum or a source of motive fluid. The particular source of fluid pressure used, for example, in the operating of the fluid motor shown, is a source of sub-atmospheric pressure and this is indicated by the tank V which may be charged by connecting it with the intake of an internal combustion engine when the fluid motor is associated, for example, with a motor vehicle. From the tank V a fluid conduit 26 connects it to one side of a conditioning valve, generally indicated by the letter C. The other side of this conditioning valve is connected by a fluid conduit 27 to a speed responsively or governor controlled selecting valve which is generally indicated by the letters GV. From this valve a fluid conduit 28 leads to the right end of the fluid motor M and a second fluid conduit 29 leads to the left end of the fluid motor. The selecting valve GV is arranged to be controlled in accordance with the speed of any driven element; and, for example, when the fluid motor is to be associated with a motor vehicle for controlling the change-speed gearing thereof, this driven element can be the propeller shaft. The speed-responsive device for controlling the valve is generally indicated by the letter G. This speed responsive device also controls a switch generally indicated by the letters GS, the purpose of which will hereinafter become apparent.

Referring to Figures 1 to 6 inclusively, the details of the selecting valve GV, the speed responsive device G and the switch GS will be described in detail. The speed responsive device is enclosed within a casing 30 having a cylindrical extending portion 31 at its upper end, within which the selecting valve GV is embodied. The bore 32 of the extending portion 31 has slidable therein a cylindrical valve element 33 which is arranged to receive a shaft 34. This shaft not only extends through the valve element, but also is of such length as to extend completely through the speed responsive device casing 30. The upper end of the shaft is journaled in the end of the casing portion 31 and the lower end of the shaft is journaled in the end plate 35 of the speed responsive device casing 30. In order to prevent rotation of the cylindrical valve element 33, yet permit its axial movement, it is provided with a longitudinal groove 36 which cooperates with the inner end of a set screw 37 carried by casing portion 31. The inner surface of the cylindrical valve element has a longitudinally extending groove 38 which extends the entire length of the valve element and serves as an atmospheric passage for the valve element. An exit passage 39 permits it to communicate with the upper end of the casing 31 and holes 40 are employed to place this upper end in communication with the atmosphere.

The valve element 33 is also provided with four axially spaced, radially extending atmospheric ports 41, 42, 43 and 44 which place the axially extending groove 38 in communication with the exterior surface of the valve element. These ports are arranged to cooperate with the ports 45 and 46 in the wall of the casing portion 31, which ports, respectively, are connected to the conduits 28 and 29 leading to the fluid motor as already mentioned. The valve element also has two annular grooves 47 and 48 in the exterior surface thereof. These grooves are in communication with each other by way of the longitudinal groove 36 which latter groove is arranged to cooperate with port 49 to which conduit 27 is connected. Accordingly, with this construction of the valve element 33 it is possible to connect both ends of the fluid motor to atmosphere and also connect either end of the fluid motor to atmosphere while the opposite end is connected to the source of fluid pressure.

When the valve element 33 is at the upper end of the casing portion 31, as it will be when the speed-responsive device is at rest or not operating (see Figures 1 and 6), the atmospheric ports 42 and 44 will be opposite the conduit ports 45 and 46. Thus both ends of the fluid motor will be connected to atmosphere by way of the axial groove. If the cylindrical valve element 33 is moved downwardly from the position shown in Figures 1 and 6 to the position shown in Figure 2, then the annular groove 48 will be placed in communication with the port 44 of the conduit 29 and the atmospheric port 41 will be placed in communication with the port 45 leading to the conduit 28. Since the annular groove 48 will now be in communication with the axial groove 36 and said axial groove is exposed to the port 49 of the conduit 27 coming from the source of sub-atmospheric pressure, the air in the left end of the M motor can be exhausted so that differential fluid pressure can act on the piston to move it to its extreme left end position. If the valve element 33 is moved downwardly still further, the atmospheric port 43 will be connected to the conduit 29 leading to the left end of the cylinder of the fluid motor and the annular groove 47 will be connected to the port 45 and the conduit 28 leading to the right end of the cylinder. When groove 36 is in communication with port 49 and the source of sub-atmospheric pressure, then the right end of the fluid motor will have its air withdrawn therefrom so that differential pressure acting on the piston will cause it to move to the extreme right end of the cylinder. This position of the valve element is shown in Figure 3.

The lower end of the cylindrical valve element 33 extends into the casing 30 of the speed-responsive device G and rotatably mounted on this lower end is a sleeve 50 carrying radially extending arms 51 and 52. Links 53 and 54 connect these arms with the upper ends of two centrifuge members 55 and 56 which are pivoted on the shaft 34 by means of a pin 57. The shaft 34 below the centrifuge members carries a gear 58 with which meshes a worm gear 59 carried on a shaft 60 which, for example, may be the propeller shaft of a motor vehicle. A spring 61 surrounding the shaft 34 acts on the sleeve 50 and opposes the downward movement of the sleeve caused by the movement of the centrifuge members towards each other due to an increasing speed of the shaft 34. As the centrifuge members move toward each other, they will move the valve element 33 downwardly to selectively connect the two ends of the fluid motor M with the source of fluid pressure and atmosphere thus causing reciprocable movement of the piston 6 thereof as hereinbefore described.

The movable element of the switch GS, which is also controlled by the speed-responsive device G, comprises an annular contact washer 62 carried by the arms 51 and 52 and insulated therefrom by the annular washer 63 of suitable insulating material. The switch has two fixed contact elements 64 and 65 carried by the upper end wall of the casing 30 and suitably insulated from the casing. When the centrifuge members 55—56 are at rest the spring 61 will maintain the annular contact washer in engagement with both contacts 64 and 65 and thus electrically connect these two contacts together to close a circuit, which circuit is generally indicated by the letter Y and will be later referred to.

It is desirable to provide means for locking the piston 6 of the fluid motor M at the extreme ends of its stroke so it will not be necessary to rely on effective differential fluid pressure to maintain the piston at such ends against the bias of a centering spring continuously effective against said piston. It is also desirable that this locking or holding means be automatically unlocked or released whenever it is desired to move the piston from one end of the cylinder 1 to the other. I have accomplished this by certain novel mechanical locking mechanism which is generally indicated by the letter L and is directly associated with the piston 6 and the connected piston rod 7. The locking mechanism is also arranged to be controlled by a solenoid generally indicated by the letter S. This solenoid has for its primary function, when energized, the releasing of the aforesaid locking means in response to personally-operable means independently of other lock releasing means operated automatically when differential fluid pressure is effectively applied to the piston 6, but not with sufficient force to actually move it from one end of its cylinder to the other.

The hollow piston rod 7 previously referred to is provided with axially spaced rectangularly shaped locking holes 66 and 67 which are interconnected by a narrow longitudinal slot 68. A locking plunger 69 is arranged to engage selectively in these holes, which plunger also forms the armature of the aforementioned solenoid S, which solenoid is secured to the extension 8 acting as a guiding support for the piston rod 7. The lower end of the plunger 69 has a rectangular locking portion 70 conforming substantially to the shape of the holes 66—77 and also a V-shaped narrow tip 71. This tip is arranged to slide in the slot 68 interconnecting the two holes 66 and 67 and whenever a hole is presented opposite the lower end of the plunger, the plunger enters the hole and thus lock the rod 7 against endwise movement. A spring 72 acting on the plunger 69 assists in forcing the locking portion thereof into engagement with the holes. The holes 66 and 67 are so spaced axially that when the piston 6 is at the extreme left or forward end of its cylinder the hole 67 will be presented to the plunger so that the locking end can enter such hole and lock the piston 6 at the left end of the cylinder. The hole 66 is so arranged that when the piston is moved to the extreme right end of its cylinder the locking end of the plunger can enter this hole and hold the piston at such end. With the V-shaped tip 71 and the cooperating slot 68, the plunger is always insured of being properly aligned with the rectangularly shaped locking holes 66—67 so that the locking portion thereof can freely drop therein when either hole is presented selectively for engagement thereby. The V-shaped tip also provides engageable means to enable the plunger to be unlocked automatically by fluid pressure actuated means associated with the piston 6 which will hereinafter be fully described in detail.

Part of the above mentioned automatic unlocking means for the plunger comprises a rod 73 positioned within the hollow portion of the piston rod 6 for limited relative sliding movement therein. On this rod are two axially spaced cams 74 and 75 for selectively engaging the V-shaped tip 71 of the plunger 69 to force the rectangular locking portion of the plunger out of the holes 66—67. The inner end of the rod 73 is arranged to be connected to a piston diaphragm 76 which is movable within a chamber 77 formed by cupping the central portions of the two plate like members 15 and 16 of the cylinder piston 6. The peripheral portion of the diaphragm 76 is clamped between the two aforesaid piston members. In order that air pressure on opposite sides of the piston may be effective simultaneously on the diaphragm, the member 15 is provided with holes 78 (see Figure 7) and the member 16 is provided with a single centrally located hole 79 (see Figure 8). With this arrangement it is seen that the same differential fluid pressure which acts upon the piston is also effective on the diaphragm and this diaphragm can be moved back and forth a predetermined extent in the chamber 77 relative to the piston, thus causing slidable actuation of the rod 73.

If the piston 6 of the fluid actuated motor M should be moved by differential fluid pressure (selecting valve GV in the position shown in Figure 2) to the extreme left end of the cylinder from the position shown in Figure 1 to the position shown in Figure 2, the diaphragm will be at the left side of the chamber 77. When the piston assumes its position at the left end, the rectangular end of the plunger will drop into the hole 67, and thus lock the piston in this position. Due to the fact that the diaphragm is at the left side of the chamber 77, the rod 73 will be so positioned that the cam 75 will be on the left side of the V-shaped tip 71 of the plunger 69. If the condition of the selecting valve GV should now become such (see Figure 3) that the differential fluid pressure tends to move the piston from the left end toward the right end, the piston 6 will not be moved because it is locked. However, the diaphragm can be moved a predetermined cycle relative to the piston 6 by differential fluid pressure effective on opposite sides of the piston, notwithstanding such effective pressure may be insufficient to actually move the piston 6 were it unlocked, and consequently the diaphragm will be moved from the left side of the chamber 77 to the right side. This will move the rod 73 and result in the cam 75 engaging the V-shaped tip of the plunger and moving the locking portion of said plunger out of the hole 67 as disclosed in Figure 3. The piston rod 7 will now be freed and consequently differential fluid pressure acting with maximum force on both the piston and diaphragm will be effective to move the piston to the extreme right end of the cylinder. During the movement of the piston from the left end to the central point in its travel, the spring 19 will be effective in moving the piston together with the differential fluid pressure. The spring, however, is of such strength that it can move the piston itself without any aid from the differential fluid pressure. After the piston reaches its central point, differential fluid pressure alone will be effective on the piston and it will result in the piston being moved to the extreme right end of the cylinder, thereby compressing spring 20, all as indicated in Figure 4. The piston will now be locked automatically at the right end of the cylinder, as shown in Figure 4, and the cam 74 will be on the right side of the V-shaped tip 71 of the plunger 69. This condition is brought about by the diaphragm being at the right side of its chamber 77.

If the selecting valve element 33 should again assume a position wherein a source of sub-atmospheric pressure is effective on the left side of the piston, as illustrated in Figure 5, differential fluid pressure will be effective on the piston, tending to move it from the right end towards the left end. The piston 6, however, cannot move since the piston rod 7 is locked against movement by the plunger. However, the diaphragm, which is also acted upon by said differential fluid pressure, is free and it will be moved from the right side of its chamber to the left side and cause the rod 73 to move correspondingly to thus move the end of the locking portion of the plunger out of the hole 66, thus releasing the piston and piston rod for movement to their selected operative position. The unlocked condition of the plunger is shown in Figure 5. As soon as the piston and piston rod are unlocked, differential pressure, if sufficiently forceful, will effect movement of the piston from the right end of the cylinder to the left end. During the time that the piston is moving from the right end to the central point of its stroke, the spring 20 will be expanding and assist the movement of the piston. After the piston passes the central point, differential fluid pressure alone will act on the piston and cause it to move to the left end, at the same time compressing the spring 19. When the piston reaches the left end it will be locked automatically in this position as indicated in Figure 2.

Whenever it is desired to unlock the piston when at either extreme end of its cylinder so that it can assume its central position with respect thereto, as shown in Figure 1, the solenoid S is employed to cause this operation. Whenever this solenoid is energized by manual manipulation of lever 90 the plunger 69 will be pulled out of a hole by electromagnetic force, thereby freeing the piston rod and so that of the springs 19 or 20 (whichever is compressed) can be effective to centralize the piston. The solenoid is connected in an electrical circuit which is indicated by the letter Z and is parallel to the previously referred to circuit Y in which the switch GS is embodied, as is also the solenoid S. One terminal 80 of the solenoid is connected by a conductor 81 to one terminal 82 of a manually controlled switch X. The other terminal 83 of this switch is connected by a conductor 84 to one terminal of a battery B, the other terminal of which is grounded as shown in Figure 1. To complete the circuit Z, the other terminal 85 of the solenoid is connected by a conductor 86 to the casing of the fluid motor M, thus grounding and completing the circuit. The grounding conductor 86 is also common with the circuit Y. The conductor 84 between the switch X and the battery B may have embodied therein a manually-controlled switch 87 for breaking the circuit. This switch can be the usual ignition switch of the internal-combustion engine if the fluid motor and control means are to be used on a motor vehicle. The switch 87 also controls the parallel circuit Y as well as the circuit Z.

The circuit Y comprises a conductor 88 which connects the terminal 80 of the solenoids with the terminal 64 of the speed-responsively controlled switch GS. The other terminal 63 of this switch GS is connected by a conductor 89 to the conductor 84 coming from the battery B.

The switch X in the circuit Z and the conditioning valve C, already referred to, are both arranged to be controlled by a single manually-operated lever 90. The conditioning valve C, shown in Figures 1 and 3, comprises a casing 91 having a bore 92 in which is positioned a movable valve element 93. The casing is provided with diametrically opposed ports 94 and 95, the former having connected to it the fluid conduit 27 leading to the selecting valve GV and the latter the fluid conduit 26 coming from the tank V. The valve element 93 has a cross passage 96 and a cross slot 97. The lever 90 is shown as directly connected to the valve element. When this lever is set as shown in the position shown in Figure 1, the cross passage 96 will be in a position to cooperate with the ports 94 and 95 and thus connect the fluid conduits 26 and 27 together. This is the open position of the conditioning valve C. If the lever is rotated in a counter-clockwise direction from the position shown in Figure 1 to the position shown in Figure 13, then the fluid conduits 26 and 27 will be disconnected and the slot 97 placed in communication with the port 94 and conduit 27. This will place the conduit 27 in communication with atmosphere by way of a passage 98 in the valve casing.

The switch X is positioned below the conditioning valve C and the details thereof are shown in Figures 9 to 12. The switch has a casing 99 on which are mounted the previously referred to terminals 82 and 83, these terminals being connected, respectively, to contact elements 100 and 101 carried on the inside of the casing. Within the casing is mounted a plunger 102 carrying a plate 103 on the underneath side of which is secured a conducting element 104 arranged to contact and bridge the contact elements 100 and 101 to thus close the switch. A spring 105 associated with the plunger normally biases the plunger upwardly to a switch open position. The upper end of the plunger extends out of the casing 99 and is arranged to cooperate with a cam plate 106 carried by and movable in unison with the valve element and connected lever 90. This cam plate has two curved surfaces 107 and 108 of different radii and a connecting sloping surface 109 therebetween. The cam plate also is provided with a slot 110 into which extends a stop pin 111. The stop pin and slot determine the two extreme positions of the movement of the lever 90.

When the lever 90 is in the position shown in Figure 1 to open the conditioning valve C, the surface 108 of the cam plate will be cooperating with the plunger 102 of the switch X and under such conditions the switch will be held open by the spring 105. Thus the circuit Z will be broken. If the lever is moved to the position shown in Figure 13 wherein the conditioning valve C is closed and the conduit 27 connected to atmosphere, the switch X will be closed by the sloping surface 109 of the cam and the surface 107 positioned so as to maintain the switch closed. Thus the circuit Z will be established to thereby energize the solenoid S and hold the locking plunger 69 released against the bias of the plunger engaging spring 72. The circumferential position of the sloping surface 109 on the cam plate 106 is such that the switch X will not be closed thereby until the conditioning valve C has first been closed.

Operation

Referring now to the operation of the described fluid pressure operated motor and the control means therefor, let it be assumed by way of example, that it is to be employed for controlling a shiftable element of an automatic change-speed gearing, said element being the one controlling the second and high speeds thereof. Under such conditions the lever 90 will correspond to the steering column mounted gear-shifting or selecting lever. This lever can also be considered as manually controlling a lower speed to start the vehicle. It is also assumed that the hand operated switch 87 for both electrical circuits Z and Y is closed. If the vehicle should be at rest, then the speed-responsive device G will not be operating as it is to be driven by the vehicle propeller shaft and, therefore, the switch GS will be closed. Consequently the solenoid S will be energized as this solenoid S is also in circuit Y as well as circuit Z. It is also assumed that the conditioning valve C has been moved to its open position, as shown in Figure 1, and under such conditions the circuit Z will be open. When the solenoid S is energized the locking mechanism L will be unlocked and the piston 6 of the fluid motor M will be at its central position (shown in Figure 1), this central position resulting from the action of the two centralizing springs 19 and 20. The central position of the piston will correspond to the neutral condition of the gearing element to be controlled by the fluid motor. Both ends of the fluid motor, under such conditions, will be connected to atmosphere due to the position of the selecting valve GV, the valve element of which is at its extreme upper position as shown in Figures 1 and 6.

If the vehicle should be started in low speed, then, of course, as the vehicle speed increases the speed-responsive device G will correspondingly function, causing the centrifuge members 55—56 to open the switch GS, thus de-energizing the solenoid S, resulting in the circuit Y being broken. The circuit Z is already broken due to the open condition of the switch X, as a result of moving lever 90 to the position shown in Fig. 1, wherein the conditioning valve C is open. When a vehicular speed has been reached whereby the centrifuge members of the speed-responsive device G have moved the valve element 33 of the selecting valve GV to the position shown in Figure 4, the left end of the fluid motor will be connected to the sub-atmospheric pressure tank V and the right end of the fluid motor will be connected to atmosphere through fluid conduit 28, ports 42 and 45, groove 38, passage 39 and holes 40. There will now exist a differential fluid pressure acting on the piston 6 of the fluid motor and this will result in the piston being moved from its central position, shown in Figure 1, to the left end of the fluid motor cylinder, which position is shown in Figure 2. During the movement of the piston rod 7 with the piston 6 the locking plunger 69 will ride along on top of the hollow piston rod with its V-shaped tip 71 freely sliding through the slot 68, and the two parallel shoulders formed at the juncture of the tip 71 with the locking portion 70 will be engaged with the outer surface of rod 7 while the tip 71 is passing through the narrow slot 68. As soon as the piston reaches the left end of the cylinder, the rectangular end of the locking plunger will enter the hole 67 under the action of spring 72 (solenoid S being de-energized), thus locking the piston at the extreme left end of the cylinder with the spring 19 compressed, all as shown in Figure 2. When the piston is moved to the left end of the cylinder, of course the arms 9 and 13 to which it is connected will be actuated and if the actuated rod 14 is connected to a gear ratio changing element this element will be placed in an operative position, which position can be assumed to be that of second speed in a three speed gearing.

As the speed of the vehicle increases the centrifuge members 55—56 will also be thrown out farther by the rotating speed of the shaft 34 and this will result in the valve element 33 of the selecting valve GV assuming the position shown in Figures 3 and 4. When this position is assumed the right end of the fluid motor will be connected to the sub-atmospheric tank V and the left end of the fluid motor will be connected to the atmosphere through the fluid conduit 29, ports 46 and 44, groove 38 and selecting valve 33 in the manner already previously described in detail. Consequently there will be differential fluid pressures acting on the piston 6 and such will cause operation of the diaphragm 76 carried by the piston and without any movement of the piston since the piston is locked against movement notwithstanding the effective pressure may be sufficient to move it. The movement of the diaphragm will be from the position shown in Figure 2 to the position shown in Figure 3 and such will result in the plunger 69 of the locking mechanism L being unlocked by cam 75, which unlocked condition is shown in Figure 3. With the piston now free to move, the differential fluid pressures acting on the piston will be effective to move the piston from the extreme left end of the cylinder to the extreme right end of the cylinder, that is, from the position shown in Figures 2 and 3 to the position shown in Figure 4. During movement of the piston from the left end toward the right end, the spring 19 will be effective to aid the differential fluid pressure in moving the piston to its central position. From the central position to the right end of the cylinder the differential fluid pressure only will be effective in moving the piston and during this movement of the piston the spring 20 will be compressed. When the piston reaches the right end of the cylinder the locking rectangular portion 70 of the locking plunger 69 will drop into the hole 66 and thus lock the piston at the right end of its cylinder.

When the piston is at the right end of the cylinder and the speed of the vehicle should drop so that the selecting valve GS is again in the position shown in Figure 2, the left end of the fluid motor will be connected to the subatmospheric tank V and the right end of the fluid motor will be connected to the atmosphere as previously described. Differential fluid pressure conditions then existing in the fluid motor will cause the diaphragm positioned in the piston to move from the position shown in Figure 4 to the position shown in Figure 5, thereby unlocking the piston in the manner hereinbefore fully described. Since the piston 6 is now free the differential fluid pressures effective thereon will move the piston from the right end of the cylinder to the left end of the cylinder wherein it will be locked as shown in Figure 2. During the movement of the piston from the right end to the central point of its travel, spring 20 will assist the differential fluid pressures in moving the piston and from the central position to the left end of the cylinder differential fluid pressures alone will be effective in moving the piston and compressing the spring 19.

If the piston should be at either extreme end of the cylinder of the fluid motor M it can be caused to return to its central position at any time by merely closing the conditioning valve C. This is accomplished by moving the lever 90 from the position shown in Figure 1 to the position shown in Figure 13. With the closing of the conditioning valve C the conduit 27 will be connected to atmosphere and thus, irrespective of the position of the selecting valve GV, both ends of the fluid motor will be connected to atmosphere. When the lever 90 is moved to the position shown in Figure 13, closing the conditioning valve C, the switch X will also be closed and consequently the circuit Z established, which will result in the solenoid S being energized. The energization of the solenoid will move the locking plunger 69 upwardly, thus pulling the locking portion 70 of the plunger out of whichever hole, 66 or 67, it may be engaged. This will unlock the piston and since there are no differential fluid pressures acting thereon, it will be centered in the cylinder by the action of whichever centering spring, 19 or 20, has been compressed.

Centering of the piston may also be accomplished automatically by the closing of the switch GS. This may be desirable when the vehicle is brought to a stop. Whenever the switch GS is closed the solenoid S will be energized and the piston unlocked in the same manner as by closing switch X. It will then be returned to its central position by the action of whichever spring, 19 or 20, has been compressed. It is to be noted when the piston is automatically caused to be moved to its central position as the result of the closing of switch GS, the valve element 33 of the selecting valve GV will be in the position shown in Figures 1 and 6 so that both ends of the fluid motor will be connected with atmosphere, notwithstanding the fact that the conditioning valve C is open. If the conditioning valve C should be open at the time that the piston is automatically returned to its central position, then of course after the switch GS is subsequently opened by the speeding up of the vehicle, then the piston 6 will be moved automatically to its extreme left end whenever the selecting valve GV assumes the position shown in Figure 2.

It is to be noted that the piston 6 of the fluid motor M will always be moved from one end of the cylinder to the other and locked automatically in its extreme end positions unless the switch GS is closed or the conditioning valve C closed. If the switch GS becomes closed the piston will be returned automatically to its central position by a centralizing spring. If the lever 90 is operated to close the conditioning valve C and thus also close switch X, the latch 70 will be released by the solenoid S when energized so that the piston 6 may return to its central position by the associated spring means. Notwithstanding any condition of the selecting valve GV, it is always possible for the piston 6 to be returned automatically to a central position by operation of the lever 90 to close the conditioning valve C.

MODIFIED LOCKING MECHANISM

(Figs. 17 to 21, inclusive)

Referring to Figures 17 to 21, inclusively, there is shown another locking mechanism for the piston 6 of the fluid motor M which mechanism is entirely mechanical and is arranged to be released at will by mechanical connecting means between the hand lever 90, which controls the conditioning valve C, and the locking mechanism. In this modified locking system and manually operated mechanical release mechanism, the necessity for the use of electrically operated switches and solenoids is eliminated. As disclosed by the views indicated above, the parts employed and already referred to in the description of the structure shown in Figures 1 to 16 inclusively are designated by like reference numerals. The construction of the fluid motor M with the centering spring means for the piston 6 is identical. The selecting valve GV is retained and its method of control by the speed responsive device G. Since no electrical circuits are to be employed, the speed-responsive device control switch GS is eliminated. Also retained in the structure to be described is the conditioning valve C slightly modified by repositioning the passage 96 which is designated as 96' and the valve element by reference numeral 93 and the control lever 90.

The piston rod 7' for the cylinder piston 6 of the fluid motor, is of hollow construction and extending therethrough is the rod 73' movable by the diaphragm piston 76 embodied in the cylinder piston. The outer end of the hollow piston rod is connected by an adjustable clevis to the arm 9' secured to the shaft 11 journaled in the support 12 which may be, for example, the cover plate of an automotive change speed gear housing. The hub of the arm 9' is arranged to have diametrically opposed shoulders 112 and 113. On opposite sides of this hub are two bell-crank lever latches 114 and 115 which are pivoted, respectively, on pins 116 and 117 carried by the support 12. A perspective view of these latches per se is shown in Figure 21. The lower arm 118 of the latch 114 is arranged to cooperate with the shoulder 112 and the lower arm 119 of the latch 115 is arranged to cooperate with the shoulder 113. A spring 119' is connected between the arms 118 and 119 and normally biases them inwardly toward a piston locking position. Whenever the piston of the fluid motor is moved to the extreme left end of the cylinder the latch 114 will engage the shoulder 112 and thus lock the piston at this left end as shown in Figure 19. When the piston is moved to the extreme right end of the cylinder, the latch 115 will engage the shoulder 113 and thus lock the piston at the right end of the cylinder as shown in Figure 20.

In order to selectively release the latches by movement of the diaphragm piston 76 and connected rod 73', the latches 114 and 115 are provided, respectively, with arms 120 and 121 which overlap above the hub of arm 9'. These arms are arranged to be controlled by a pin 122 which is carried on the upper end of a lever 123 pivotally mounted on a pin 124 carried by the outer end of shaft 11 to which the hub of the arm 9' is secured. The lower end of the lever 123 is pivotally connected to the rod 73' which is controlled by the diaphragm 76. The arms 120 and 121 have curved surfaces 125 and 126 at the inner ends of which are depressions 127 and 128 for receiving the pin 122.

When the pin 122 is riding on either of the surfaces 125 or 126 the latches will be maintained in a position wherein they cannot engage the shoulders to lock the piston at the ends of its full stroke. This condition is shown in Figure 17. When the piston reaches either end of its stroke, the lever 123 will be in such a position that its pin 122 can drop into a recess and thus release a latch to be biased inwardly so that it can engage its shoulder. Such a condition is shown in Figure 19 wherein the piston is at the left end of the cylinder, and the lever 123 so moved, that the pin 122 is received in the recess 127, thus freeing the latch 114 so that its arm 118 can engage shoulder 112 and lock the piston in its said left position. When the piston is at the right end of the cylinder the lever 123 will be so positioned that the pin 122 will be in the recess 128 of latch 115 so that the arm 119 of this latch can be caused to engage shoulder 113 and hold the piston locked at the right end of the cylinder. This latter locking condition is shown in Figure 20.

If the piston is locked at one end of its full travel, as for example the left end, then the latch 114 which is holding the piston locked will be released automatically when the piston is energized to be moved to the other end by differential fluid pressures as a result of the movement of the diaphragm 76. The movement of the diaphragm will move the lever 123 from the position shown in full lines in Figure 19 to the dashed line position. This will result in the pin 122 riding out of the recess 127 up onto the surface 125 and thereby causing the latch to be so rotated that the arm 118 thereof will be disengaged from the shoulder 112, thus freeing the piston for movement by differential fluid pressures. In a similar manner the latch 115 will be unlocked by the movement of the diaphragm 76 whenever differential fluid pressures are effective on the piston tending to cause it to move from the right end of the cylinder to the left end. Under such conditions the pin 122 will be forced to ride out of the recess 128 onto the surface 126 of the latch arm 121 as the diaphragm 76 is moved by differential fluid pressures prior to actual movement of the piston 6, which operation frees the piston for movement.

Carried by the support 12 between the conditioning valve C and the latches 114—115 is a casing structure 129 in which is reciprocally mounted a plunger 130 (see Figures 17, 18 and 19). The upper end of this plunger is arranged to cooperate with a cam plate 106' carried operated by the lever 90 which controls the conditioning valve C. The lower end of the plunger is arranged to cooperate with two overlapping arms 131 and 132 carried, respectively, by the latches 114 and 115. These arms are in parallel planes to the previously referred to arms 120 and 121 of the latches. The eccentric cam surface 133 on the cam plate 106' is so formed that when the conditioning valve C is closed the plunger 130 will be forced downwardly to apply pressure to either of the two arms 131 or 132 and thus force a locked latch outwardly so as to free it from its locked condition. This unlocks the piston from its position at an end of the cylinder and accommodates the corresponding compressed centering spring to automatically move the piston to its central position. It is to be noted that whenever the conditioning valve C is closed (see Figure 17) the piston will have atmospheric pressure on both sides thereof and thus be free to be moved by a compressed centering spring. When the conditioning valve C is open the eccentric cam surface 133 will be so positioned that the plunger 130 can freely be moved upwardly to release either latch to selectively assume latching position under the action of spring 119'.

MODIFIED LOCKING MECHANISM OPERATION

*(Figs. 17 to 21, inclusive)*

From the foregoing description it is believed that the operation of the structure shown in Figures 17 to 21, inclusive, is obvious. This operation, briefly stated, is as follows: When the conditioning valve C is closed the piston will be automatically placed in its central position by action of the centering spring 19 or 20, if locked at either end of its full travel, as the closing of the conditioning valve will result in the freeing of the piston by releasing the locked condition of a latch. This condition is shown in Figure 17. With the piston in its central position and the conditioning valve C opened, it will remain in the central position until the speed-responsive device G is so operated as to cause the selecting valve GV to connect the left end of the fluid motor M with the tank V. Under such conditions differential fluid pressures will be effective to move the piston 6 to the left end of the cylinder 1, which position is shown in Figure 19. When the piston reaches its left end arm 118 of latch 114 will engage shoulder 112 and thus cause the piston to be locked in this position. When the speed-responsive device is conditioned so that the right end of the fluid motor M is connected to the tank V, differential fluid pressures will be effective on the diaphragm piston 76 to cause it to move from the position shown in full lines in Figure 19 to the dotted line position. This movement of the diaphragm will unlatch the latch 114 and free the piston. Differential fluid pressures effective on the piston 6 will then cause it to move to the right end of the cylinder where it will be locked in such position by the functioning of the latch 115 (see Figure 20) that arm 119 will engage shoulder 113. If the speed-responsive device should again assume the position where the left end of the fluid motor is connected to the tank V, the differential fluid pressures acting on opposite sides of the piston will cause the diaphragm to so move that the latch 115 will be released, thus freeing the piston so that it will be moved to the left end of the cylinder where it will again be locked by latch 114. If it is desired at any time to centralize the piston, such is done manually by closing the conditioning valve C. When such occurs, whichever latch that is in locking position will be freed by the functioning of the eccentric surface 113 of the cam plate 106' acting on the plunger 130. If the piston is at the left end the spring 19 will then automatically return it to its central position. If the piston should be at the right end of the cylinder, the spring 20 will be effective to automatically return the piston to its central position.

In the structure shown in Figure 17 to 21, inclusively, it is to be noted that the piston 6 cannot return from a locked position at one end of its stroke to its central position when the governor G comes to substantially an "at rest" condition. The only way that the piston can be centered is by the movement of the hand lever 90 to the position shown in Figure 19. In this way the general operation of the structure differs from the main embodiment shown in Figures 1 to 16, inclusively.

MODIFIED UNLOCKING CYLINDER-PISTON STRUCTURE

*(Figures 22, 23 and 24)*

There are several ways in which the cam rods 73 and 73' can be moved by differential fluid pressures to unlock the piston holding means whenever conditions are such that the piston is to be moved from one end of the cylinder to the other. In Figure 22 the diaphragm piston 76 is shown as being replaced by a cylinder piston element 135. The two plate members 15' and 16' of the main cylinder piston 6' of the fluid motor M are so formed as to receive a cylindrical sleeve 134 and reciprocally mounted in this sleeve is a secondary cylinder piston 135. The piston 135 is directly attached to the end of the lock controlling rod 73 or 73'. When the left end of the fluid motor is connected to the source of sub-atmospheric pressure the piston 135 will be moved to the left end of the sleeve 134 to accomplish the unlocking of the locking mechanism in the identical manner hereinbefore fully described. When the right end of the motor M is connected to the source of sub-atmospheric pressure, the piston 135 will be moved to the right end of the sleeve 134 to accomplish the unlocking of the locking mechanism.

It is also practical and obvious to employ the main pistons 6' and 6'' of the fluid motor M for operating the rods 73 or 73' to accomplish the unlatching. In Figures 23 and 24 such a structure is shown. The piston 6'' is constructed with plates 15'' and 16'' and is arranged to have limited relative movement with respect to the piston rod 7''. To establish the limits of the relative movement between the piston and the piston rod, the piston rod carries spaced annular shoulders 136 and 137. The piston is directly connected to either the rod 73 or 73' by a pin 138 which extends through a slot 139 in the piston rod. The springs 19 and 20 are employed to center the piston rod and to accomplish this the sleeves 22' and 24' associated with the contralizing springs 19 and 20 respectively are arranged to abut against the shoulders 136 and 137, the latter shoulder consisting of a steel snap ring. The piston is directly connected to the rod 73 or 73' by a pin 138 which extends through a slot 139 in the piston rod. The springs 19 and 20 are employed to center the piston rod 7'' and to accomplish this the sleeve 22' associated with the spring 19 is arranged to abut against the shoulder 136 on the piston rod and the sleeve 24' associated with the spring 20 is arranged to abut against the shoulder 137.

When the source of sub-atmospheric pressure is connected with the left end of the fluid motor M, the piston 6'' will be moved relatively to the piston rod 7'' and by this relative movement will move the rod 73 or 73' to unlock the piston rod locking means L or latches 114-115. After the piston rod is unlocked the piston will directly engage the piston rod and move it correspondingly. When the source of sub-atmospheric pressure is connected with the right end of the fluid motor, the piston will have limited relative movement to the piston rod, which relative movement will unlock the piston rod after which the piston will directly move the piston rod to its extreme right hand position.

Having now illustrated and described different embodiments of my invention, I desire it to be understood that my invention is not to be limited in the broader aspects thereof to the specific forms, combinations and arrangements of structure herein shown and described for illustrative purposes, except in so far as such limitations are specified in the appended claims.

I claim as my invention:

1. In a fluid-actuated motor having a casing and a movable actuating element, means for biasing the element to a predetermined position in its travel, and means responsive to a pressure differential to exert a force on the element to move the same against the force of the biasing means to a second predetermined position; the improvements which comprise means for locking said element in the second position comprising a movable member carried outside of the casing and mounted for engagement with said actuating element to lock said actuating element in said second position, an actuating member carried by said actuating element for movement relative to said element, additional means also responsive to a pressure differential for applying a force to said actuating member effective to move it relative to said element locked at the second position, and a cam on said actuating member and movable therewith relative to said actuating element for engaging said movable member upon relative movement of said actuating member with respect to said actuating element to move said member in position to unlock the locking means.

2. In a fluid-actuated motor having a movable actuating element, means for biasing the element to a predetermined position in its travel, and means responsive to a fluid pressure differential to move the element against the biasing means to a plurality of positions including a second predetermined position; the improvements which comprise means for locking said element in the second position, means for applying a force on said element effective to move it from the second position, means comprising a manual member for controlling the force applying means, means operable by said force applying means for unlocking the locking means, and means operable at will by the manual member for unlocking the locking means independently of operation of said force applying means.

3. In a fluid-actuated motor having a movable actuating element, means for biasing the element to a predetermined position in its travel, and means responsive to a fluid pressure differential to exert a force on the element to move the same against the force of the biasing means to a second predetermined position; the improvements which comprise speed responsive means for controlling the fluid pressure force applying means, means for locking the element in the second-named position, additional means responsive to a fluid pressure differential and actuated independently of said first-mentioned pressure responsive means for unlocking the element by fluid pressure force, and means also controlled by the speed responsive means for releasing said locking means.

4. In a fluid-actuated motor having a movable actuating element, means for biasing the element to a predetermined position in its travel, and means establishing a force to move the element against the force of the biasing means to a second predetermined position; the improvements which comprise speed responsive means for controlling said last-named means, means for locking the element in the second-named position, means also controlled by the speed responsive means for releasing said locking means, and manually-controlled means operable at will to release the locking means notwithstanding the condition of the speed responsive means.

5. In a fluid-actuated motor having a movable element, means for baising the element to a predetermined position in its travel, a source of fluid pressure different from atmosphere, conduit means for connecting the source to the motor to move the element to another predetermined position by fluid pressure against the biasing means, and valve means for controlling the passage of fluid through the conduit means; the improvements which comprise means including a reciprocable member operable independently of fluid pressure to and movable into locking engagement with the movable element to lock the movable element in the last-named position, and means comprising cam means carried by said movable element and movable by fluid pressure from the source independently of movement of the movable element when said movable element is in said last-named position and having a camming surface for engaging the reciprocable member to cam the same from its locking position thereby unlocking said locking means and freeing the biasing means to be effective in returning the element to the first predetermined position.

6. In a fluid-actuated motor having a movable element, means for biasing the element to a predetermined position in its travel, a source of fluid pressure different from atmosphere, and conduit means for connecting the source to the motor to move the element to another predetermined position by fluid pressure against the biasing means; the improvements which comprise valve means for controlling the passage of fluid through the conduit means, means for locking the movable element in the last-named position, means controlled by fluid pressure from the source for unlocking said locking means and freeing the biasing means to be effective in returning the element to the first predetermined position, other valve means for disconnecting the source of fluid pressure from the motor, means comprising a manually-controlled means for placing said other valve means in disconnecting position, and means operable by the manually-controlled means for subsequently releasing the locking means at will.

7. In a fluid-actuated motor having a movable element, spring means for biasing the element to a predetermined position of its travel, and a source of fluid pressure different from atmosphere connected by conduit means to the motor; the improvements which comprise valve means for controlling the passage of fluid through the conduit means, speed responsive means for moving the valve to an open position so that fluid pressure from the source can move the motor element from the predetermined position to another position against the bias of the spring means, means for locking the motor element in said last-named position, fluid pressure operated means controlled by the speed responsive device and the valve means for releasing the locking means, means comprising manually-controlled means for cutting off the source of fluid pressure from the motor, and means also controlled by the manually-controlled means for releasing the locking means at will.

8. In a fluid-actuated motor having a movable element, spring means for biasing the element to a predetermined position of its travel, and a source of fluid pressure different from atmosphere connected by conduit means to the motor; the improvements which comprise valve means for controlling the passage of fluid through the conduit means, speed responsive means for moving the valve to an open position so that fluid pressure from the source can move the motor element from the determined position to another position against the bias of the spring means, means for locking the motor element in said last-named position, fluid pressure operated means controlled by the speed responsive device and the valve means for releasing the locking means, a cut-off valve between the source and the motor, a solenoid for the unlocking of the locking means when energized, an electrical circuit for the solenoid including a switch, and manual means for closing the cut-off valve and the circuit switch at will.

9. In a fluid-actuated motor having a movable element, means for biasing the element to an intermediate position in its travel, a source of fluid pressure different from atmosphere, conduit means for connecting the source with the opposite ends of the motor, and valve means for selectively connecting the source with said opposite ends so that the element can be moved to said ends against the biasing means by differential fluid pressure; the improvements which comprise means for locking the movable element at the ends of the motor comprising a single reciprocable member movable into locking engagement with said movable member, and means carried by and relatively movable with respect to said movable element for moving said reciprocable member from locking engagement including a rectilinearly movable cam having a camming surface engageable with said reciprocable member to cam said movable member out of engagement with said movable element and also including actuating means for said cam operable by fluid pressure independently of that pressure tending to move said element against said locking means.

10. In a fluid-actuated motor having a movable element, means for biasing the element to an intermediate position in its travel, a source of fluid pressure different from atmosphere, and conduit means for connecting the source with opposite ends of the motor; the improvements which comprise valve means for selectively connecting the source with said opposite ends so that the element can be moved to said ends against the biasing means by differential fluid pressure, means for locking the movable element at the ends of the motor, means operable by fluid pressure when caused to be effective on the movable element to move it from either of the ends of the motor for unlocking the locking means, manually-controlled means, other valve means operable by the manually-controlled means for cutting off the source of pressure, and means for releasing the locking means at will by the manually-controlled means and permitting the biasing means to be effective to place the element in its said intermediate position.

11. In a fluid-actuated motor having a movable element, means for biasing the element to an intermediate position in its travel, a source of fluid pressure different from atmosphere, and conduit means for connecting the source with opposite ends of the motors; the improvements which comprise valve means for selectively connecting the source with said opposite ends so that the element can be moved to said ends against the biasing means by differential fluid pressure, speed responsive means for controlling the valve means, means for locking the movable element at the ends of the motor, means operable by fluid pressure when caused to be effective on the movable element to move it from either of the ends of the motor for unlocking the locking means, a shut-off valve between the source of fluid pressure and the motor, a manually-operated member for controlling the shut-off valve, and means operable by the manually-operated member following closing of the shut-off valve for unlocking the locking means.

12. In a fluid-actuated motor having a movable element and a hollow actuating rod connected therewith and having axially spaced openings, spring means acting on opposite sides of the element to bias it to a predetermined intermediate position of its travel, a source of fluid pressure, and means including valve means for connecting the source to opposite sides of the movable element to thereby move the element to the opposite ends of its travel; the improvements which comprise means including a spring-biased member for cooperation with openings in the actuating rod for locking the element at the ends of its travel, means including cam means slidable in the hollow actuating rod for unlocking the spring-biased member, and means connected with the cam means and associated with the movable element of the motor so as to be simultaneously subjected to fluid pressure from the source when effective to move the element from its locked position for first moving the means relatively to the element to move the cam means and unlock the spring-biased locking means.

13. In a fluid-actuated motor having a movable element and a hollow actuating rod connected therewith and having axially spaced openings, spring means acting on opposite sides of the element to bias it to a predetermined intermediate position of its travel, a source of fluid pressure, and means including valve means for connecting the source to opposite sides of the movable element to thereby move the element to the opposite ends of its travel; the improvements which comprise means including a spring-biased member for cooperation with said openings in the actuating rod for locking the element at the ends of its travel, means including cam means slidable in the hollow actuating rod for unlocking the spring-biased member, means connected with the cam means and associated with the movable element of the motor so as to be simultaneously subjected to fluid pressure from the source when effective to move the element from its locked position for first moving the means relatively to the element to move the cam means and unlock the spring-biased locking means, and manually-controlled means for releasing the spring-biased locking means at will.

14. In a fluid-actuated motor having a movable element and a hollow actuating rod connected therewith and having axially spaced openings, spring means acting on opposite sides of the element to bias it in a predetermined intermediate position of its travel, a source of fluid pressure, means including valve means for connecting the source to opposite sides of the movable element to thereby move the element to the opposite ends of its travel, and means including a spring-biased member for cooperating with said openings in the actuating rod for locking the element at the ends of its travel; the improvements which comprise means including cam means slidable in the hollow actuating rod for unlocking the spring-biased member, means connected with the cam means and associated with the movable element of the motor so as to be simultaneously subjected to fluid pressure from the source when effective to move the element from its locked position for first moving the cam means aand unlocking the spring-biased locking means, other valve means for cutting off the source of fluid pressure from the motor and connecting it to atmosphere, a manually-controlled member for controlling said other valve means, and means operable by the manually-controlled member for releasing the spring-biased locking means when the other valve means is in cut-off position.

15. In a fluid-actuated motor having a movable element and an actuating rod, spring means for biasing the element to a predetermined position in its travel, a source of fluid pressure, and means including valve means for selectively connecting the source to opposite sides of the element, said element being movable against the biasing force of the spring means to a second predetermined position when the source of fluid pressure is connected to one side of the element; the improvements which comprise locking means comprising a reciprocable member cooperating with the rod for holding the element in said second position, slidable cam means movable rectilinearly of said element, and means associated with the element and operatively connected with said cam means and operable under the influence of the source of fluid pressure and movably relatively of said movable element when the source of fluid pressure is connected to the opposite side for moving the cam means to release the reciprocable member of the locking means from said actuating rod.

16. In a fluid-actuated motor having a source of fluid pressure, a movable element responsive to fluid pressure from said source, an axially bored actuating rod secured to said element and movable therewith, spring means for biasing said element to a predetermined position in its travel, and means including valve means for selectively connecting the source to opposite sides of the element, said element being movable against the biasing force of the spring means to a second predetermined position when the source of fluid pressure is connected to one side of the element; the improvements which comprise locking means comprising a reciprocable member extending into the interior of said rod for holding the element in said second predetermined position, means associated with the element and operable when the source of fluid pressure is connected to the opposite side for releasing the locking means, said last-named means comprising a member extending axially through said rod to be carried thereby and movable relatively thereto, piston means carried by said movable element for movement relative thereto and responsive to fluid pressure from said source for effecting movement of said member, and a cam rectilinearly moved by said member for camming the reciprocable member from the interior of said rod and releasing the locking means when said member is moved by being subjected to fluid pressure from the source.

17. In a fluid-actuated motor having a movable piston, spring means for biasing the piston to a predetermined position in its travel, a source of fluid pressure, and means including valve means for selectively connecting the source to opposite sides of the piston, said piston being movable against the biasing of the spring means to a second predetermined position when the source of fluid pressure is connected to one side of the piston; the improvements which comprise locking means for holding the piston in said second predetermined position, means associated with the element and operable when the source of fluid pressure is connected to the opposite side for releasing the locking means, said last-named means comprising a diaphragm carried by the piston, and connecting means including a rod and cam for releasing the locking means when the diaphragm is moved by being subjected to fluid pressure from the source.

18. In a fluid-actuated motor having a piston and an actuating piston rod, said piston being capable of limited free relative movement with respect to the rod, spring means for biasing the piston rod to a predetermined position in its travel, a source of fluid pressure, means including valve means for selectively connecting the source to opposite sides of the piston, said piston moving said rod against the bias of the spring means to a second predetermined position when the source of fluid pressure is connected to one side of the piston, and locking means exterior of the fluid motor and cooperating with the piston rod holding the piston rod in said second predetermined position; the improvements which comprise means accommodating limited free movement of the piston relative to said rod, cam means engageable with said locking means and connected with said piston for relative movement with respect to said rod and operable by the limited free movement of the piston relative to the piston rod for releasing the locking means when the piston is moved as a result of the fluid pressure from the source being connected to the opposite side of the piston, and other means for manually releasing said locking means from said rod independently of relative movement between said rod and said piston.

19. In a fluid-actuated motor having a piston and an actuating rod, a lever operated by the rod, spring means for biasing the piston to an intermediate position in its travel, a source of fluid pressure, and means including valve means for selectively connecting the source to opposite sides of the piston to move it against the spring means to the ends of its travel; the improvements which comprise latch means associated with the lever for locking the piston at the ends of its travel, and means associated with the piston and movable by fluid pressure when connected to that side of the piston to move the piston from the end of its travel for releasing the latch means.

20. In a fluid-actuated motor having a piston and an actuating rod, a lever operated by the rod, spring means for biasing the piston to an intermediate position in its travel, a source of fluid pressure, and means including valve means for selectively connecting the source to opposite sides of the piston to move it against the spring means to the ends of its travel; the improvements which comprise latch means associated with the lever for locking the piston at the ends of its travel, means asociated with the piston and movable by fluid pressure when connected to that side of the piston to move the piston from the end of its travel for releasing the latch means, and means for releasing the latch means at will independently of the last-named means.

21. In a fluid-actuated motor having a piston and an actuating rod, a lever operated by the rod, spring means for biasing the piston to an intermediate position in its travel, a source of fluid pressure, and means including valve means for selectively connecting the source to opposite sides of the piston to move it against the spring means to the ends of its travel; the improvements which comprise latch means associated with the lever for locking the piston at the ends of its travel, means associated with the piston and movable by fluid pressure when connected to that side of the piston to move the piston from the end of its travel for releasing the latch means, means comprising a manually-operated member for releasing the latch means at will, a shut-off valve between the source and the motor, said valve when closed connecting the motor to atmosphere, and means for closing the shut-off valve by the manually-operated member prior to releasing the latch means.

22. In a fluid-actuated motor having a cylinder, a piston and an actuating rod mounted therein for reciprocable movement, spring means for biasing said piston and rod to a predetermined position in their stroke, a source of motive fluid under pressure, means for selectively admitting motive fluid to opposite ends of said cylinder for actuating said piston and rod against the biasing force of said spring means to another predetermined position; the improvements which comprise a lock for said piston and rod including an element movable into operative engagement with said rod for locking said piston and rod in said other position, means for effecting the operative engagement of said element with said rod, and a motive fluid actuated member carried by said piston and movable relatively thereto a predetermined degree for releasing said lock prior to actuation of said piston and rod from their aforesaid last-named position.

23. In a fluid-actuated motor having a casing, a movable actuating element extensible from said casing, means within said casing and responsive to a pressure differential in the casing to move the element to predetermined first and second positions, and means outside of said casing for locking said element by physical engagement therewith in at least one of said positions; the improvements which comprise lock release actuating means slidably carried by said element for movement therewith to said predetermined positions and movable relative to said element when said element is locked in one of said positions to release said locking means, a release cam on said lock release actuating means for engaging said locking means to cam said locking means from engagement with said element, and differential pressure responsive means for initiating movement of said lock release actuating means to move said cam to a release position prior to movement of said element from said locked position.

GLENN T. RANDOL.

REFERENCES CITED

The following references are of record in the file of this patent:

UNITED STATES PATENTS

| Number | Name | Date |
| --- | --- | --- |
| 1,073,403 | Dalton | Sept. 16, 1913 |
| 1,842,776 | Bogoslowsky | Jan. 26, 1932 |
| 2,020,847 | Mitereff | Nov. 12, 1935 |
| 2,056,006 | Hodgkins | Sept. 29, 1936 |
| 2,074,772 | Brown | Mar. 23, 1937 |
| 2,221,121 | Wallace | Nov. 12, 1940 |
| 2,267,464 | Iavelli | Dec. 23, 1941 |
| 2,336,715 | Casler | Dec. 14, 1943 |
| 2,349,244 | Brown | May 23, 1944 |

FOREIGN PATENTS

| Number | Country | Date |
| --- | --- | --- |
| 397,512 | Great Britain | Aug. 22, 1933 |
| 493,471 | Great Britain | Oct. 10, 1938 |